United States Patent Office 3,056,761
Patented Oct. 2, 1962

3,056,761
PROCESS FOR THE MANUFACTURE OF COPOLY-ETHERESTERS FROM ACIDS HAVING THE FORMULA

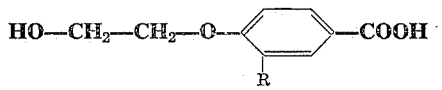

TEREPHTHALIC ACID AND GLYCOLS
Wolfgang Griehl and Hans Lückert, Chur, Switzerland, assignors to Inventa A.G. fur Forschung und Patentverwertung, Zurich, Switzerland
No Drawing. Filed Nov. 18, 1959, Ser. No. 853,673
Claims priority, application Switzerland Dec. 20, 1958
2 Claims. (Cl. 260—47)

The invention relates to a process for the production of linear copolyetheresters and for the production of fibers thereof, and more particularly to an improvement of fibers made, e.g., of ethylene glycol, terephthalic acid and an acid of the general formula

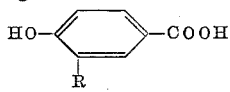

or a polyester forming derivative thereof, wherein R is a hydrogen atom or a methoxy radical.

It is known that polyesters of terephthalic acid and polymethylene glycols can be fabricated into cold-stretchable fibers, films, etc., of high strength and good elasticity. A disadvantage is the difficulty encountered in the fabrication of films from these polyesters due to the strong tendency toward crystallization and the very narrow softening range. This is particularly true for polyesters made from terephthalic acid and ethylene glycol.

On the other hand, a polyester of ω-oxy-ethoxyvanillic acid can be formed into fibers which dye easily and also can be fabricated into films and foils. However, the stretching of these compounds which is necessary to bring out the outstanding features of these polymers meets with difficulties.

It now has been found that copolyesters of excellent strength, good elasticity and good dyeability are obtained by the copolymerization of an acid of the general formula

or a polyester forming derivative thereof, wherein R is a hydrogen atom or a methoxy radical ethylene glycol and terephthalic acid. Fibers and filaments made from such copolyesters can very well be cold-stretched and have an extraordinary tensile strength. Moreover, these copolymers can easily be fabricated into films and foils because of their lesser tendency to crystallize, as compared to polymethylene terephthalate. Whereas the polyester of ω-oxy-ethoxyvanillic acid tends to discolor or even to decompose, practically colorless and very high-molecular products are obtained by the copolymerization of an acid of the general formula

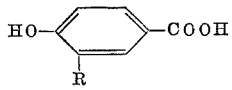

or a polyester forming derivative thereof, wherein R is a hydrogen atom or a methoxy radical, and ethylene glycol terephthalate. With regards to the proportions of these components, it has been established that copolymers having a high terephthalic acid content are suited for the production of fibers while copolyesters consisting predominantly of ω-oxy-ethoxyvanillic acid lend themselves well for the production of films and foils.

It is opportune to use as starting materials for the copolymerization bis-β-oxyethyl terephthalate and an ester of the general formula

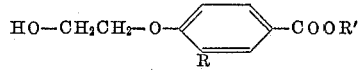

wherein R is a hydrogen atom or a methoxy radical and R' hydroxy ethyl radical. The components are heated in an inert atmosphere with agitation and in a good vacuum to 240–260° C. in the presence of a catalyst which promotes an ester interchange. Depending upon the catalyst and upon the condensation conditions (whereby the amount of vacuum applied is of considerable importance), copolyesters are obtained within 4 to 6 hours which have the melt viscosity required for spinning. Catalysts promoting the ester interchange are especially compounds, soluble in the reaction mixture, of alkalis, alkaline, alkaline earths, zinc, cadmium, cobalt, antimony, manganese, tin and titanium. In order to limit the molecular weight of the copolyesters, it sometimes is opportune to add substances suitable for stabilization. As such stabilizers, particularly the anhydrides of nonvolatile monocarboxylic acids have proven quite satisfactory.

The fabrication of the copolyesters made by the process as described can be accomplished either from the melt or from a solution. The former is preferred for the manufacture of fibers, the latter for film and foils.

The process according to the invention now will be further illustrated by the following examples. However, it should be understood that these are given merely by way of explanation, not of limitation, and that numerous changes may be made in the details without departing from the spirit and the scope of the invention as hereinafter claimed.

Example 1

85 grams bis-β-oxyethyl terephthalate and 15 g. ω-oxyethoxyvanillic acid-ω-oxyethyl ester are heated in the presence of 0.1 g. cobalt acetate to 220° C. in a condensation vessel provided with agitator, gas inlet and vacuum connection. Simultaneously, a weak stream of an inert gas is conducted through the melt. The temperature then is raised to 250° C. within 1 hour and, at the same time, a vacuum of 25–100 mg. Hg is applied. After distilling the principal amount of the ethylene glycol, split off during the polycondensation, the vacuum is increased stepwise until 0.05–1 mm. Hg have been attained. This usually takes approximately one hour. Heating in vacuo and with good agitation is continued for 4–6 hours whereby the mass becomes increasingly more viscous and finally attains a very high viscosity. The copolyester thus obtained, after cooling, is an opaque, practically colorless porcelain-like product. Fibers spun from this copolyester can be cold-stretched to five times their original length and have good tensile strength and good dyeability.

Example 2

40 g. bis-β-oxyethyl terephthalate and 60 g. ω-oxyethoxyvanillic acid-ω-oxyethyl ester are subjected to a polycondensation in the presence of 0.5 g. antimony acetate. The process used is the same as described in Example 1. The copolyester obtained is of a faintly grey color and porcelain-like. It is easily dissolved in such organic solvents as phenol, cresol, phenol-acetylene tetrachloride and also in sulfuric acid. The polymer is particularly suited for the fabrication into films and foils.

Example 3

Ester interchange between dimethyl terephthalate is effected by heating 155 g. of the ester in the presence of 0.1 g. calcium acetate with 75 ml. ethylene glycol. The methanol is removed by distillation as it is formed. After the addition of 0.05 g. antimony acetate as a polycondensation catalyst and of 50.8 p-(β-oxy-ethoxy)-benzoic acid-β-oxyethyl ester the reaction mixture is further heated and stirred in a vessel provided with gas inlet and vacuum connection. The temperature then is raised to 280° C. within 1–2 hours, at the same time the vacuum is lowered to 0.3–1 Torricellian units. After a reaction time of 3–4 hours the copolyetherester is as viscous as needed for the manufacture of films, filaments etc. By melt spinning the copolyetherester filaments are obtained which easily can be cold drawn.

A solution (0.5% by weight) of the polymers in a mixture of phenol and acetylenetetrachloride (50:50 by vol.) has a specific viscosity of 1,430. The polymer has a softening point between 208 and 214° C.

*Example 4*

166 g. p-(β-oxy-ethoxy)-benzoic acid, 26 g. dimethylterephthalate and 66 g. ethylene glycol are heated in a flask, provided with a reflux-condenser in the presence of 0.1 g. cobalt salicylate at a temperature of 170 to 200° C. After removing the methanol formed by distillation, the reaction mixture is heated and stirred. The reaction temperature is raised to 280–290° C., and a weak stream of an inert oxygen-free gas is conducted through the slightly blue melt.

The vacuum which is 25–50 mm. Hg at the beginning is lowered slowly during the polycondensation to 0.2–1 mm. Hg. By stirring vigorously, the vaporization of the ethylene glycol, formed during the polycondensation, is facilitated.

After a condensation time of 5–6 hours, a copolyetherester of a high molecular weight is obtained which is suitable to prepare films, foils and molded articles. The softening point is between 175 and 180° C. The specific viscosity of a solution 0.5% by weight of the polymer in a mixture of phenol and acetylenetetrachloride is 1,385.

We claim as our invention:

1. A process for the production of copolyetheresters of high tensile strength, elasticity and dyeability, and suitable for fabrication into fibers, which comprises copolymerizing substances selected from the group consisting of 4-(β-oxyethoxy)-3-methoxybenzoic acid in mixture with ethylene glycol, p-(oxyethoxy)-benzoic acid in mixture with ethylene glycol, and oxyalkyl esters of said acids, with a compound selected from the group consisting of bis-β-oxyethylterephthalates and dimethylterephthalate, in the presence of catalysts promoting ester interchange, within 4 to 6 hours at temperatures ranging from approximately 240 to 290° C. and at a vacuum of substantially 1 mm. Hg to a specific viscosity of substantially 1.35 to 1.45, measured as a 0.5 percent solution by weight in equal parts by weight of phenol and tetrachloroethane.

2. The process as claimed in claim 1, wherein the terephthalic acid content of said copolyesterethers ranges from 10 to 89 percent.

References Cited in the file of this patent

UNITED STATES PATENTS

| | | |
|---|---|---|
| 2,350,326 | DuVall et al. | June 6, 1944 |
| 2,600,376 | Caldwell | June 17, 1952 |
| 2,692,248 | Lincoln | Oct. 19, 1954 |
| 2,692,249 | Lincoln | Oct. 19, 1954 |
| 2,755,273 | Bock | July 17, 1956 |
| 2,887,468 | Caldwell et al. | May 19, 1959 |